United States Patent [19]

Jubinski

[11] Patent Number: 4,743,113
[45] Date of Patent: May 10, 1988

[54] OPTICAL FIBER INTERFEROMETER NETWORK

[75] Inventor: Paul Jubinski, Houston, Tex.

[73] Assignee: Western Atlas International, Inc., Houston, Tex.

[21] Appl. No.: 770,761

[22] Filed: Aug. 29, 1985

[51] Int. Cl.⁴ .............................................. G01B 9/02
[52] U.S. Cl. .................................. 356/345; 250/227; 367/149; 367/153
[58] Field of Search .................. 356/345; 250/227; 367/149, 153, 154; 455/608, 609; 73/657; 350/96.29, 96.30

[56] References Cited

U.S. PATENT DOCUMENTS

| | | | |
|---|---|---|---|
| 4,162,397 | 7/1979 | Bucaro et al. | 250/199 |
| 4,302,835 | 11/1981 | McMahon | 370/4 |
| 4,320,475 | 3/1982 | Leclerc et al. | 367/149 |
| 4,334,781 | 6/1982 | Ozeki | 356/368 |
| 4,360,272 | 11/1982 | Schmadel et al. | 356/35.5 X |
| 4,432,599 | 2/1984 | McMahon | 250/227 X |
| 4,517,456 | 5/1985 | Halsall et al. | 250/227 X |
| 4,534,222 | 8/1985 | Finch et al. | 356/345 X |
| 4,632,551 | 12/1986 | Pavlath | 356/345 |
| 4,697,926 | 10/1987 | Youngquist et al. | 356/351 X |

Primary Examiner—Davis L. Willis
Assistant Examiner—Matthew W. Koren
Attorney, Agent, or Firm—William A. Knox; Barry C. Kane

[57] ABSTRACT

A radiation source launches a radiant pulse of a desired width into a plurality of parallel-coupled optical sensors for modulation by a quantity to be measured. The modulated output from any two sensors taken in all combinations are interferometrically combined to generate a series of time-separated interference patterns. The interference patterns are probed by a photodetector and vectorially combined to provide the vector gradient of the quantity under measurement.

18 Claims, 2 Drawing Sheets

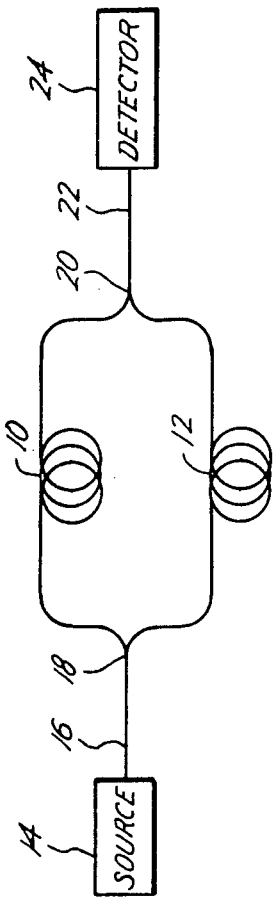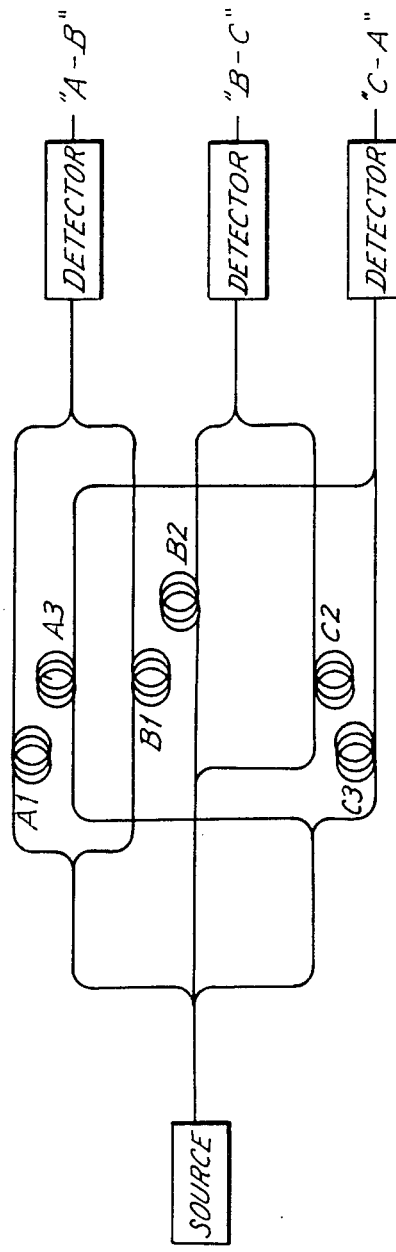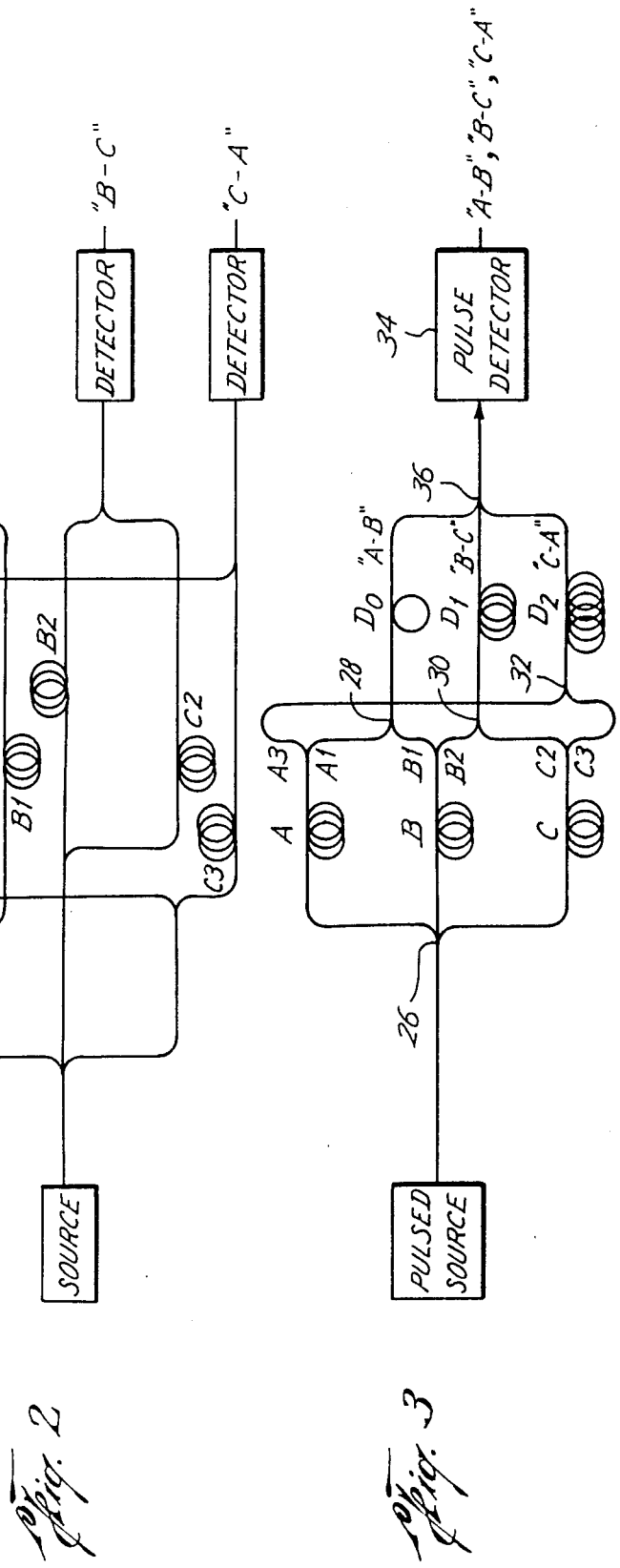

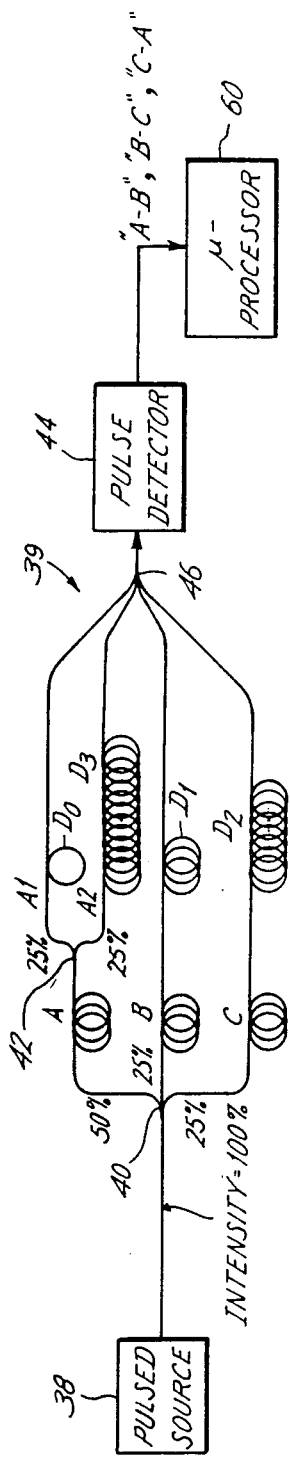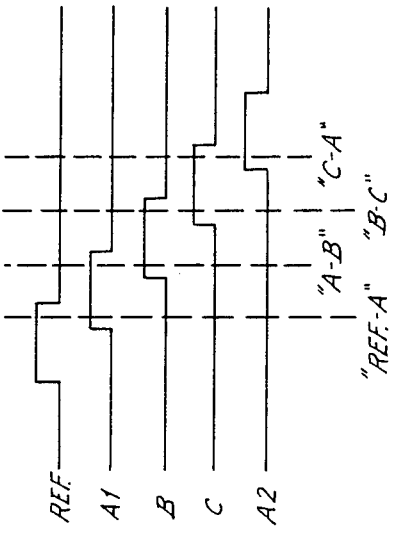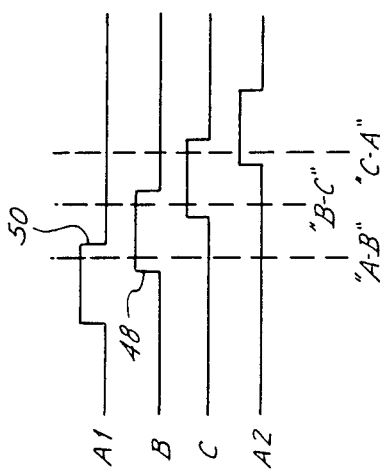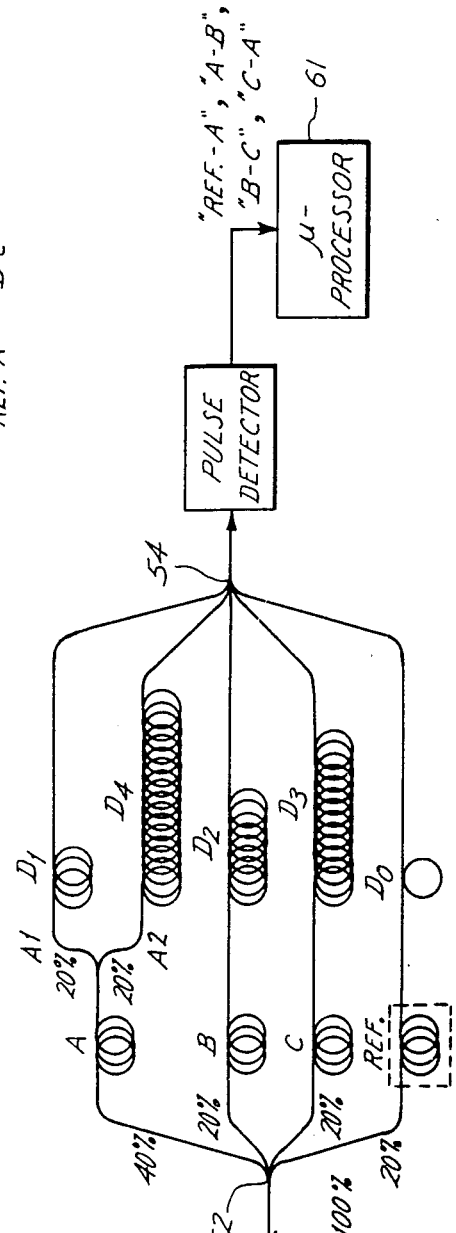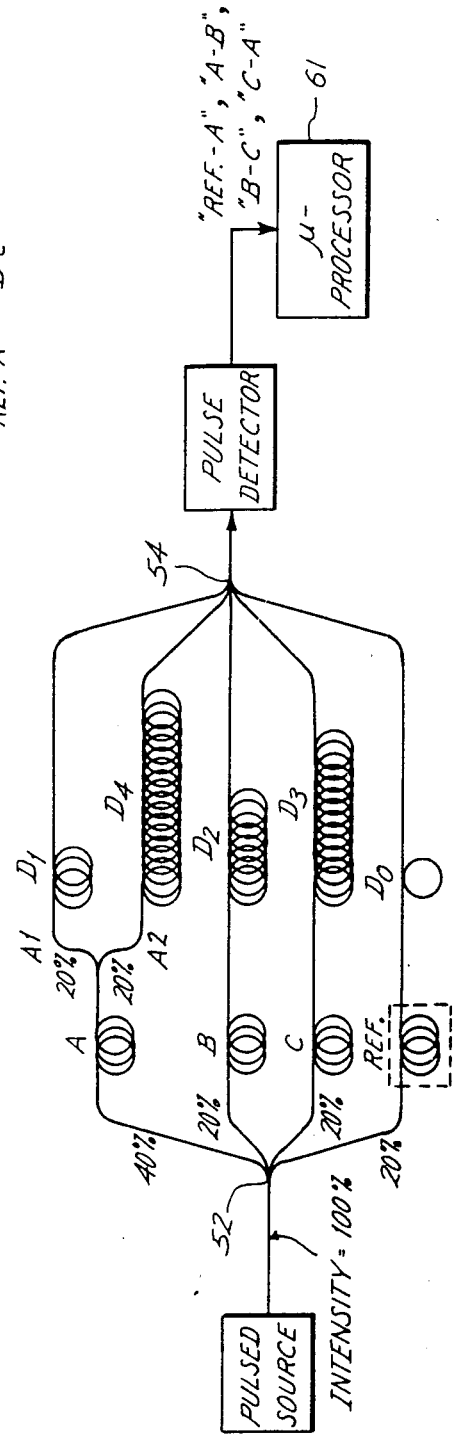

OPTICAL FIBER INTERFEROMETER NETWORK

BACKGROUND OF THE INVENTION

1. Field of the Invention

This invention relates to the field of a network of differential optical-fiber sensors for use as vector gradiometers.

2. Description of the Prior Art

Optical-fiber sensors are used in many applications such as in measurement of the pressure field in a marine environment, due to an acoustic wavefield propagating through the water. As is well known, if an optical fiber is exposed to a pressure field, changing pressures change certain physical characteristics such as the length and index of refraction of that fiber. If a beam of continuous-wave coherent electromagnetic radiation preferably optical is launched equally into two fibers and if one of those fibers is exposed to a transient pressure field, a relative phase shift will occur between the wave forms of the two beams. The phase shift is a measure of the variations of the transient pressure field. When the two radiation beams emerging from the two fibers are combined, a variable-intensity interference pattern results. A photodetector, probing the interference pattern, will see variations of light intensity or amplitude proportional to variations in phase shift between the beams, which is, in turn, a measure of the variations in the transient pressure field.

The change in the physical characteristics of the fiber is small per unit length of fiber. Hence a large length of the fiber is wound into a compact coil. A fiber length of 50 to 100 meters per coil is not uncommon. An additional advantage of use of a coil rather than an elongated fiber is that the local pressure field effectively acts on a point receiver rather than on a distributive sensor.

Examples of typical optical-fiber differential sensors are disclosed in U.S. Pat. No. 4,162,397 to Bucaro et al, and U.S. Pat. No. 4,320,475 to Leclerk et al.

The two-legged differential sensors above discussed are useful for many applications where scalar quantities are involved. They do not lend themselves to arrays of differential sensors for measuring vector gradients in two or three dimensions. One version of a gradiometer-type sensor array is disclosed U.S. Pat. No. 4,547,869, assigned to the assignee of this invention. However, the mechanization of that patent is substantially different from the invention disclosed herein.

SUMMARY OF THE INVENTION

It is an object of this invention to provide a multi-legged optical-fiber gradiometer that is economical of components and that will provide both relative and absolute vector-gradient measurements.

In accordance with one embodiment of this invention a source of radiation emits a radiant pulse having a preselected pulse width and unit output power. A single-input, multiple-output directional coupler distributes preselected fractions of the unit output power into at least three optical-fiber sensing coils. Radiant pulses emerge from each of the three sensing coils. Each emerging pulse is incrementally delayed, in sequence, with respect to a reference delay, by a delay time equal to an integral multiple of a preselected fraction of the pulse width, such that the trailing edge of one radiant pulse overlaps the leading edge of the next pulse and so on. The delayed pulses are recombined to create a sequence of interference patterns that are probed by a photodetector. The relative radiant intensity of the several interference patterns is a measure of the relative phase shift between any two sensors, taken in all combinations. From those data, a measure may be derived of the gradient of the measured quantity relative to the three sensors.

In accordance with another embodiment of this invention, a fourth protected sensor branch may be added to serve as an absolute reference.

BRIEF DESCRIPTION OF THE DRAWINGS

The benefits and advantages of my invention will be better understood by reference to the detailed description and the drawings wherein:

FIG. 1 is a schematic diagram of a two-legged differential sensor typical of the prior art;

FIG. 2 is a schematic diagram of a three-legged gradient sensor that is built up of three differential two-legged sensors of the type shown in FIG. 1;

FIG. 3 is a modification of FIG. 2 that is more economical of certain opto-electronic parts;

FIG. 4 is a schematic diagram of the configuration of a preferred embodiment of this invention;

FIG. 5 is a timing diagram corresponding to the configuration of FIG. 4;

FIG. 6 is the same as FIG. 4 except for the addition of a reference sensor; and

FIG. 7 is a timing diagram for FIG. 6.

DETAILED DESCRIPTION OF THE PREFERRED EMBODIMENT

Referring now to FIG. 1, I show a typical prior-art, two-legged differential sensor employing an interferometric design. The active elements 10 and 12 are optical-fiber coils. The complete device consists of a source of radiation 14, a source fiber 16, a directional coupler 18 for dividing a radiation beam into two equal parts, the two optical-fiber sensors 10 and 12, a directional coupler 20 for receiving and recombining modulated radiation beams from sensors 10 and 12, an exit fiber 22, and a photodetector 24. When the modulated beams are recombined, they create a pattern of interference fringes. The photodetector 24 probes and quantitatively detects the interference pattern by measuring the light intensity which is a measure of the phase difference of the radiation beams caused by the gradient of the parameter being sensed between the sensors 10 and 12. Commonly, sensor 12 is shielded from the parameter-field under measurement to act as a reference fiber so that absolute measurement can be made.

A gradient sensor can be built up from three two-legged differential sensors as shown in FIG. 2. In this configuration, sensor points A, B, and C measure the differences between A and B, B and C, and A and C. The unit requires three conventional two-legged interferometers which have legs A1-B1, B2-C2 and C3-A3. Legs A1 and A3 are collocated as are B1, B2 and C2, C3.

That design is extravagant of components, requiring seven directional couplers-recombiners, six sensors, and three photodetectors. Furthermore, the design may not be practical in all cases because first, it may not be possible to collocate the optical fiber sensors sufficiently closely and second, those sensors which have been collocated may not be sufficiently matched in terms of response.

A somewhat more compact design is shown in FIG. 3. This design uses a pulsed radiation source. The pulse width is of short duration in comparison to the time required to transit through a sensor leg. The radiation energy (intensity) is equally divided by 1×3 coupler 26 into sensors A, B, C. The parameter-modulated output pulses emanating from sensors A and B are combined at directional combiner 28; B and C are combined at combiner 30; and A and C are combined at combiner 32. Delay lines $D_0$, $D_1$ and $D_2$, are inserted after the combiners 28, 30, and 32. The incremental delay time between the delay lines is greater than the radiation pulsewidth. The delay lines must be shielded from pressure and other disturbances which might make the delay times vary excessively. The delay-line outputs are directed to photodetector 34 through 3×1 combiner 36. Because of the incremental delays imposed upon the output-pulse interference patterns, photodetector 34 will see the separate outputs of the respective sensors in sequential order. In this design, the number of sensors has been reduced to three, two photodetectors have been eliminated but one extra directional coupler has been added.

It is not necessary to keep the output pulses entirely separated in time as in the configuration of FIG. 3. Hence, a configuration that is more penurious of components is shown in FIGS. 4 and 5. Radiation source 38, which may be a Helium/Neon laser having a long coherence length, operating at a wave length of 632.8 nanometers (nm), is provided. A means (not shown), such as a Pockles cell, chops the beam of radiation emanating from source 38 into pulses having a width of, for example, 100 nanoseconds (ns) at a desired pulse repetition frequency. The pulse repetition frequency is not critical but the pulse separation time should be greater than the transit time of a pulse through any leg of the interferometer assembly, which includes a plurality of optical-fiber sensors A, B, C that are optically coupled in parallel.

In FIG. 4, source 38 feeds a radiation pulse to 1×3 directional coupler 40. Considering the input radiation intensity to coupler 40 to be 100%, 50% is directed into branch A and 25% is directed into each of branches B and C. That is, preselected fractions of the total energy are distributed to the three branches. The modulated output from branch A is evenly divided by coupler 42 between sub-branches A1 and A2. The output intensity is thus evenly divided.

Delay lines ($D_i$) are inserted into the four branches having delays $D_i$ as follows:

$A_1$, $D_0$; $A_2$, $D_3$; B, $D_1$; C, $D_2$.

The incremental delay D between any two $D_i$ is a preselected fraction of the pulse width. Thus, the time delay associated with any one sensor is different from the time delay associated with any other sensor by an integral multiple of the incremental delay $\Delta D$. $D_0$ is a base or reference delay time which may preferably be near zero. Given a pulse width of 100 ns, $\Delta D$ may be 70 ns. There would thus be an overlap of 30 ns between any two successive pulses. The overlap must be at least as long as the response time of a photodetector such as 44. For a 30 ns overlap the photodetector should have a bandwidth of better than 35 MHz. One source of a suitable photodetector is EGG Electro Optics Co. of Salem, Mass. The incrementally-delayed, overlapping pulses are recombined in multiple-input, single-output directional recombiner 46 whence the pulse interference patterns propagate to photodetector 44 for analysis.

Referring to FIG. 5, pulse $A_1$ enters recombiner 46 as shown diagramatically in the Figure. Seventy ns later the leading edge 48 of pulse B enters recombiner 46 while the trailing portion 50 of $A_1$ is still resident therein. The overlapping portions of radiation pulses $A_1$ and B interfere to produce a desired interference pattern that will be probed by photodetector 44. The above process continues for radiant pulses B and C, and C and $A_2$. The output of photodetector 44 is then a sequence of electrical signals which are a function of the intensity level due to interference between modulated radiant pulses A-B, B-C, C-A. The sequence of electrical signals may be vectorially combined by a means 60 such as a micro processor, to derive the vector gradient of the quantity measured.

The interferometer configuration of FIG. 4 provides relative gradient measurements of a selected quantity. If an absolute measurement is desired, it is a simple matter to add an extra parallel branch including a shielded reference sensor as shown in FIG. 6. FIG. 7 is the corresponding timing diagram. The division of the radiant energy is as shown in FIG. 6, viz. 20% to each of the five lines $A_1$, $A_2$, B, C and REF. Single-input, multiple-output (and the reverse) directional couplers such as 52, 54 are available, at least on an experimental basis, from the Fiber Optics Division of Allied Amphenol Co. A suitable means 61, such as a micro processor, for resolving the vector gradient is also provided.

So far, I have discussed the basic interferometer unit for use as in vector gradient measurements at a single point in space. A plurality of such units could be employed in conjunction with a distributed measurement system such as in telemetry, communications, or marine geophysical exploration. In a distributed system, although not, per se, a part of this invention, the radiation source 38 and photodetector 44 might conveniently be located at a central data-processing laboratory. The measurement interferometric units such as 39 are interconnected with the central laboratory by an optical fiber trunk line. The output data are then multiplexed from the respective interferometric units through the trunk line and back to the central laboratory. One such multiplexed system is taught in U.S. Pat. No. 4,302,835 to McMahon.

This invention has been described with a certain specificity by way of example but not by way of limitation. My invention is limited only by the appended claims. For example, earlier in this specification, ambient pressure was mentioned as a measurable quantity. Other quantities such as temperature or strain could be measured similarly.

I claim as my invention:

1. An optical-fiber gradiometer comprising:
   a plurality of optical-fiber sensors grouped in an array, optically coupled in parallel;
   means for launching a train of pulses of radiant energy, each said pulse having a desired width in the time domain, into said optical-fiber sensors for modulation by a quantity to be measured;
   means for receiving the train of modulated pulses from said optical-fiber sensors;
   means for recombining the received train of pulses from any two sensors in all combinations thereof, to form a sequence of interference patterns; and
   means for quantitatively detecting said interference patterns.

2. The optical-fiber gradiometer as defined by claim 1, comprising:
   an optical time-delay line coupled to the output of each optical-fiber sensor, the time delay associated with any one sensor being different from the time delay associated with any other sensor by an integral multiple of a time increment relative to a reference delay time.

3. The optical-fiber gradiometer as defined by claim 2 wherein the time increment is a preselected fraction of the pulse width.

4. The optical-fiber gradiometer as defined by claim 3 wherein the time increments are selected such that the trailing portion of a pulse from one sensor is present at said means for recombining simultaneously with the leading portion of a pulse from another sensor.

5. The optical-fiber gradiometer as defined by claim 1, comprising:
   means for evaluating the vector gradient of said measured quantity from said detected interference pattern.

6. The gradiometer as defined by claim 2 comprising:
   means for dividing the output of a one sensor into two branches, one branch having said reference delay line coupled thereto and the other branch having a multiple-increment delay line coupled thereto.

7. The gradiometer as defined by claim 2, comprising:
   a protected reference sensor coupled in parallel with the quantity-measuring sensors for providing an absolute measure of a vector gradient of the quantity measured.

8. An optical-fiber gradiometer, comprising:
   a source of coherent radiation for emitting a radiant pulse having a preselected pulse width and unit output intensity;
   a single input, multiple output directional coupler for distributing preselected fractions of the radiant pulse energy into a plurality of optical-fiber sensing coils, each having an input and an output fiber, said sensing coils being capable of modulating the phase of said radiant pulse in accordance with the magnitude of a quantity under measurement;
   means for incrementally delaying the modulated radiant pulse, emerging from each sensing coil, by a delay time equal to an integral multiple of a preselected fraction of the pulse width such that the trailing portion of a first pulse overlaps the leading portion of a later-delayed second pulse;
   a multiple input single output directional coupler for receiving and recombining the respective delayed, data-modulated radiant pulses to generate a sequence of interference patterns;
   a photodetector for probing the sequence of interference patterns, to provide electrical signals proportional to the interference-pattern radiation level of each interference pattern of the sequence, said electrical signals being a function of the magnitude of the quantity being measured.

9. The optical-fiber gradiometer as defined by claim 8, comprising:
   at least three sensor coils collocated in an array, coupled in parallel.

10. The optical-fiber gradiometer as defined by claim 8, comprising:
    at least three sensor coils collocated in a single array and a fourth protected sensor coil, coupled in parallel with said collocated sensors, to act as a reference sensor for absolute measurement of a vector gradient.

11. The optical-fiber gradiometer as defined by claim 8, comprising:
    means for vectorially combining said electrical signals to derive the vector gradient of the quantity measured.

12. A gradiometer, comprising:
    a plurality of optical fiber sensors responsive quantitatively to a physical quantity;
    means for launching a radiant pulse into said sensors,
    means for interferometrically generating radiant pulses representative of response differences between all selected combinational pairs of said sensors,
    means for time-separating said radiant pulses representative of different ones of said response differences, and
    means for detecting said time-separated representative radiant pulses.

13. A gradiometer for optically measuring a direction and magnitude of a transient pressure field, comprising:
    a plurality of optical sensors coupled in parallel to each other;
    means for launching a pulse of radiation into each of said plurality of sensors;
    means for combining said pulse of radiation from any one of said plurality of sensors to the pulse of radiation in another one of said plurality of sensors in all combinations thereof, to form a series of interference patterns; and
    means for detecting said series of interference patterns, the interference patterns indicating in combination the direction and magnitude of the transient pressure field.

14. A gradiometer as defined in claim 13, wherein said plurality of optical sensors coupled in parallel to each other are arranged in a predetermined array.

15. A gradiometer as defined in claim 14, wherein said means for launching a pulse of radiation into each of said optical sensors comprises a coherent beam laser.

16. A gradiometer as defined in claim 14, further comprising an optical time-delay coupled to an output of each optical sensor, the time delay associated with any one of said plurality of sensors being different from the time delay associated with any other of said plurality of sensors by an integral multiple of a time increment relative to a reference delay time.

17. A gradiometer as defined in claim 16, wherein the time increment selected is such that a trailing portion of a pulse from one of said plurality of sensors is present at said combining means simultaneously with a leading edge of a pulse from another of said plurality of sensors.

18. A gradiometer as defined in claim 17, further comprising a protected referenced sensor coupled in parallel to said plurality of optical sensors, for providing an absolute measure of the direction and magnitude of said transient pressure field.

* * * * *